Nov. 30, 1971

E. F. GRUBBS 3,623,187

SKINNING TOOL

Filed April 21, 1970

INVENTOR
EDWARD F. GRUBBS

BY *Strauch, Nolan, Neale, Nies & Kurz*
ATTORNEYS

United States Patent Office 3,623,187
Patented Nov. 30, 1971

3,623,187
SKINNING TOOL
Edward F. Grubbs, Rte. 2, Walnut Cove, N.C. 27052
Filed Apr. 21, 1970, Ser. No. 30,505
Int. Cl. A22b 5/16
U.S. Cl. 17—21   7 Claims

ABSTRACT OF THE DISCLOSURE

A tool for aiding in the manual skinning of small animals comprising a vertical rod support suspended from overhead support means and a base portion connected to the lower end of the rod and positioned at working height for a skinner. The base has on one side a tailbone extraction section for use in removing the tailbone from the tailskin of the pelt and on the other side an elongated taper section within which a hind leg of the carcass is wedged to support the carcass as the pelt is stripped downwardly therefrom.

BACKGROUND OF THE INVENTION

This invention relates generally to animal skinning apparatus and more particularly to a novel skinning tool especially useful for aiding in manually skinning small animals, such as mink. The novel tool is simple in construction and relatively inexpensive to manufacture, but is very effective in permitting a skinner to quickly skin the animal without damaging or degrading the pelt.

Breeders who raise small animals such as mink for the purpose of selling the pelts to furriers are confronted with two main problems when skinning time arrives and the pelt is to be removed from the carcass. Of primary consideration is the quality and condition of the pelt after it is removed and it is most desirable that there be a minimum number of tears or defects in the pelt, since this will degrade and reduce the economic value of the pelt. For example, in the past one area of the pelt which has experienced tearing and rupturing during skinning operation has been the tailskin area due to difficulties in removing the tailbone from the tailskin.

A second consideration for a breeder is the speed or rate at which the animal may be skinned without damaging the pelt. Since a large number of animals, e.g. hundreds or thousands, may have to be skinned during the same skinning period, it is of course desirable that the skinning operation be as quick and simple as possible to produce high quality pelts.

Various devices have been proposed for automatically skinning small animals, but these have tended to be quite complicated structurally and operationally, and, as a result, quite expensive. In addition, the speed of operation and quality of the pelts was often unsatisfactory and, hence, the overall profits to the breeder, particularly a small breeder, were reduced.

SUMMARY OF THE INVENTION

Accordingly, a primary object of the invention resides in the provision of a novel structurally simple inexpensive skinning tool for aiding in manually skinning small animals and obtaining high quality pelts.

Another object of the invention resides in the provision of a novel skinning tool used in manually skinning a small animal, the tool comprising a tailbone extraction section which enables the skinner to quickly remove the tailbone from the tailskin without damaging or tearing the latter and a leg holding section for suspending the carcass as the pelt is manually stripped therefrom.

Still another object resides in the provision of a novel skinning tool comprising a spring-steel frame suspended at its upper end from a suitable support and having at its lower end on one side thereof a notched tailbone extraction section used while removing the tailbone from the tailskin and on its other side an elongated V-shaped leg-holding recess for supporting the carcass as the remainder of the pelt is stripped therefrom. The tool assists a skinner in quickly and easilly skinning several animals a minute without tearing and degrading the quality of the pelts. A significant advantage lies in the fact that the tool may be used by inexperienced personnel, such as unskilled laborers employed only during the skinning season.

Other objects and advantages will become apparent from reading the following detailed description of several embodiments of the novel skinning tool in which like numerals indicate like parts, with the scope of the invention, however, being limited only by the appended claims.

DETAILED DESCRIPTION OF THE INVENTION

Figure 1:
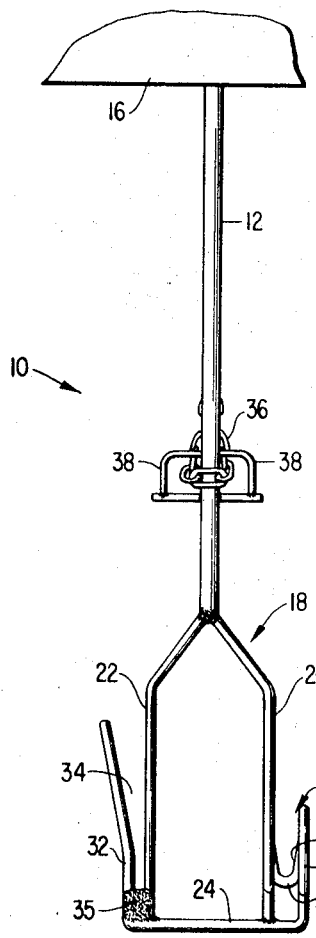
FIG. 1 is a front elevation view of the novel skinning tool as it is suspended in operative position from an upper support.
Figure 2:
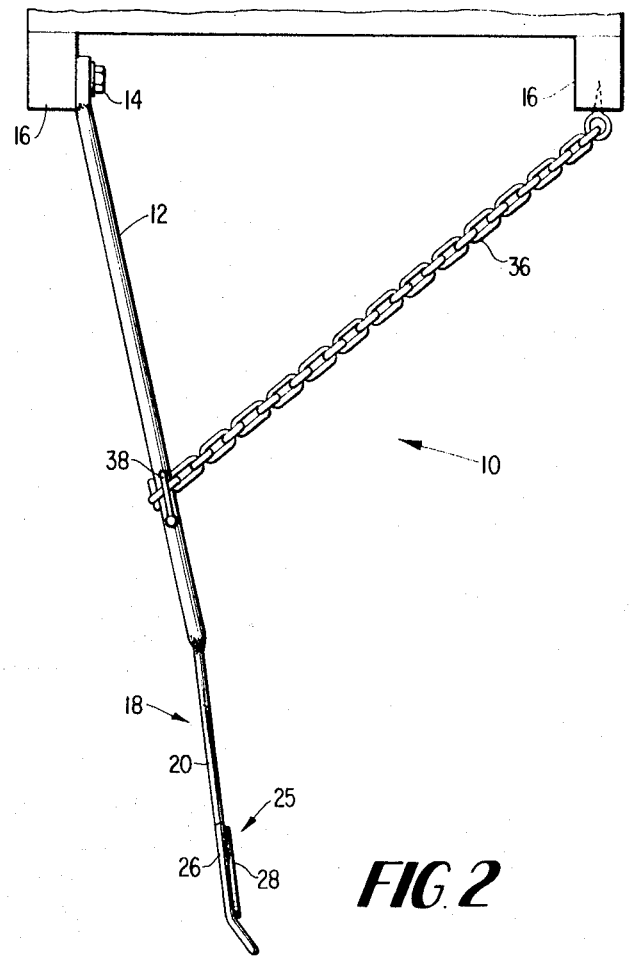
FIG. 2 is a right side elevation view of the tool illustrated in FIG. 1.

Referring now to FIGS. 1 and 2, the skinning tool 10 is preferably constructed of spring steel and includes a vertical support rod 12 bolt or otherwise connected at its upper end 14 to a support means 16 such as an overhead ceiling support beam, or on an A-frame support structure. A base portion 18 is rigidly connected to the lower end of rod 12 and positioned at working height in front of a skinner. Base 18 includes a pair of laterally spaced downwardly depending side bars 20 and 22 connected at their upper ends to rod 12 and angled rearwardly at their lower ends which are closed by a transverse rod 24. A tailbone extraction section 25 is formed by a short end extension 26 of rod 24 which is bent upwardly in generally parallel laterally spaced relation to side bar 20. A rigid tailbone extraction element 28 having an internal V-shaped notch 30 is welded between the rear faces of side bar 20 and end 26. Element 28 provides overall strength and reinforcement to extraction section 25.

The other elongated end 32 of rod 24 is bent upwardly and angled outwardly from side bar 22 to form an elongated, V-shaped tapered recess 34 within which a hind leg of the carcass of the animal is grasped and wedged during a skinning operation. The base area 35 between side bar 22 and end 32 is preferably reinforced with a filler material such as weld.

The angle formed within notch 30 is relatively small to accommodate the ordinarily small sized tailbone which successively decreases in diameter outwardly towards its end. As described hereinafter, initially during the tailbone extraction step, the carcass is supported from tool 10 with the tailbone wedged in notch 30. If the angle of notch 30 were too large, the tailbone would merely slip from the notch and the carcass would fall.

The angle formed within elongated taper 34 is larger than that of notch 30 to receive the larger sized hind leg of the animal by which the carcass is suspended as the pelt is stripped therefrom.

To steady tool 10 during use and resist the forward pull created as an animal is skinned, a restraining member 36 such as a chain or rope, is connected within a pair of loops 38 on rod 12 and extends rearwardly and upwardly to be secured to support means 16. Member 36 is ordinarily pulled taut to place rod 10 under a slight tension and remove any play therefrom.

Figure 4:
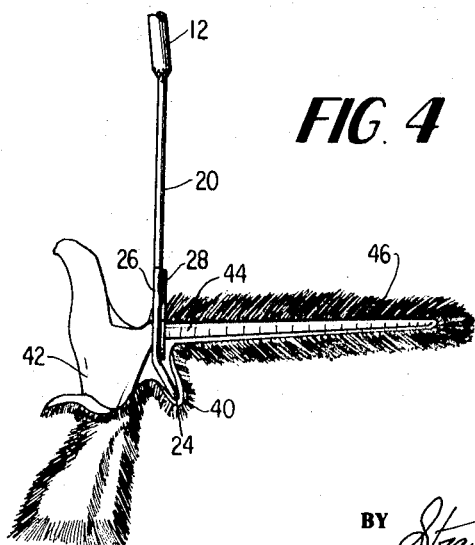
FIG. 4 is an enlarged fragmentary side elevation view taken along line 4—4 of FIG. 3 and illustrating the manner in which the tailbone is extracted from the tailskin.
Figure 3:
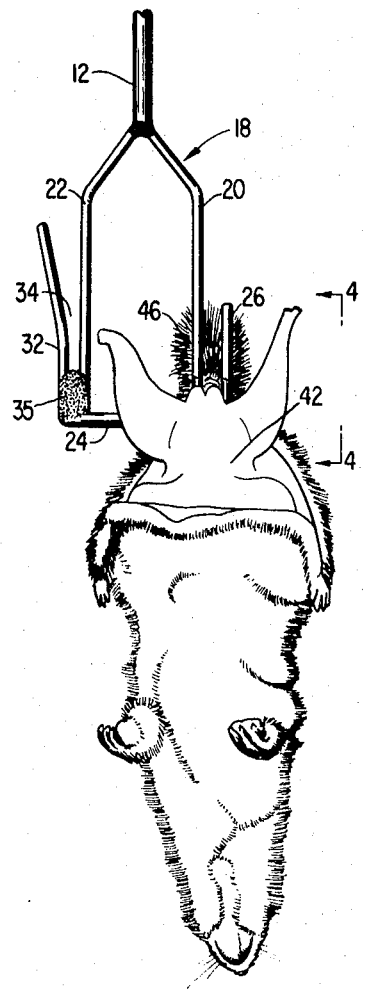
FIG. 3 is a fragmentary front elevational view illustrating the position of an animal on the tool while the tailbone is being extracted from the tailskin.
Figure 5:
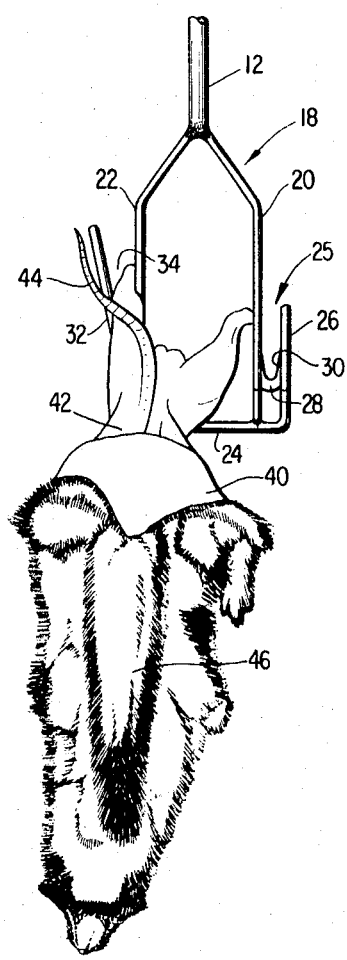
FIG. 5 is a fragmentary front elevation view similar to FIG. 3 but illustrating the position in which the animal is supported on the skinning tool as the remainder of the pelt is stripped from the carcass.

Referring now to FIGS. 3–5, a typical skinning operation of an animal will be described. Initially, the pelt or hide 40 is cut around the hind quarters and legs of the dead animal and stripped from those areas of the carcass 42 as shown in FIG. 3. The skinner then grasps the carcass and places the base of the tailbone 44 within notch 30 with the belly facing the skinner. As seen in FIG. 4, the portion of the pelt adjacent the tailskin 46 will extend underneath rod 24 and tailbone 44 is snugly received within notch 30 to suspend the carcass and pelt from tool 10. The skinner then pulls the carcass forwardly and downwardly to completely withdraw tailbone 44 from tailskin 46.

The carcass is then rotated through 180° and the right hind leg is wedged within taper 34 to suspend the animal as shown in FIG. 5 with its back facing the skinner. Note particularly the appearance of tailskin 46 previously removed from tailbone 44. The skinner then grasps the pelt 40 and pulls it downwardly off carcass 42 and after the pelt is suitably cut around the front paws, completely removes it from the carcass.

Thereafter, the carcass is dropped from the tool and the next animal skinned in the same manner.

In actual practice, tool 10 has very effectively aided the skinner in obtaining high quality pelts. Substantially no unnecessary tearing or rupturing has occurred in the tailskin area of the pelt and this feature has increased the value of the pelts and overall economic gain to the breeder.

In addition, the tool is much cheaper than known automatic skinner devices, enables a skinner to remove the pelts at a greater rate, e.g. about three pelts per minute, and produces less degrading tears in the pelts.

Various modifications of the described tool may be made without departing from the scope of the invention. For example, the rearwardly bent lower ends of bars 20 and 22 may be eliminated and rod 24 welded to the bars at a point directly beneath element 28 and taper end 32. Filler 35 would thereby be eliminated.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A skinning tool for use in skinning a small animal comprising a rod adapted to have one end connected to support means, a base portion connected to the other end of said rod, said base portion having along one side thereof tailbone extraction means for aiding in the removal of the tailbone from the tailskin of the animal and having along another side elongated taper means for receiving and holding a leg of the animal as the pelt is stripped from the carcass.

2. A skinning tool as defined in claim 1, said base portion comprising a pair of laterally spaced side bars connected at one end to said rod and at their other ends to a transverse rod extending therebetween, said tailbone extraction means including notch forming means connected to one of said side bars and sized to receive the tailbone of said animal, and said elongated taper means connected to the other of said side bars and sized to receive and hold a leg of said animal.

3. A skinning tool as defined in claim 2, said tailbone extraction means being formed by one short end extension of said transverse rod which is bent to extend in generally parallel, laterally spaced relation to said one side bar and a notch-forming element rigidly connected between said one short end and said one side bar, and said elongated taper means being formed by the other elongated end extension of said transverse rod which is bent to extend angularily away from said other side bar to define an elongated tapered recess therebetween.

4. A skinning tool as defined in claim 1, comprising restraining means adapted to be connected between said rod adjacent its other end and said support means for steadying said tool during use.

5. A skinning tool for use in skinning a small animal comprising a vertical support rod adapted to have its upper end connected to support means, and a base portion connected to the lower end of said rod, said base portion including a pair of laterally spaced side bars connected at their upper ends to the lower end of said rod and at their lower ends to a transverse rod extending therebetween, tailbone extraction means formed along one of said side bars for aiding in the removal of the tailbone from the tailskin of the animal, elongated taper means formed along the other side bar for receiving and holding a leg of the animal as the pelt is stripped from the carcass, and restraining means connected to the lower end of said support rod and extending rearwardly and upwardly for connection to said support means, said restraining means steadying said rod and base portion during use of said tool.

6. A skinning tool as defined in claim 5, said tailbone extraction means including a rigid element forming a notch sized to snugly receive the tailbone of the animal, and said elongated taper means having a tapered recess sized to snugly receive and hold a leg of said animal during a skinning operation.

7. A skinning tool as defined in claim 5, said tailbone extraction means being formed by a short end extension of said transverse rod which is bent upwardly to extend in generally parallel, laterally spaced relation to said one side bar and a rigid notch-forming elements connected between said short end extension and said one side bar, and said elongated taper means being formed by the other elongated end extension of said transverse rod which is bent upwardly to extend upwardly angularly away from said other side bar to define an elongated tapered recess therebetween.

References Cited
UNITED STATES PATENTS

| | | | |
|---|---|---|---|
| 2,261,749 | 11/1941 | Walsh | 17—21 |
| 2,489,734 | 11/1949 | Walsh | 17—21 |
| 3,137,030 | 7/1964 | Varner | 17—44.2 |
| 3,570,049 | 3/1971 | Muckelrath | 17—44.2 |

LUCIE H. LANDENSLAGER, Primary Examiner

U.S. Cl. X.R.
17—44.2